US011308357B2

United States Patent
Iwasaki (10) Patent No.: US 11,308,357 B2
(45) Date of Patent: Apr. 19, 2022

(54) TRAINING DATA GENERATION APPARATUS

(71) Applicant: HONDA MOTOR CO., LTD., Tokyo (JP)

(72) Inventor: Shun Iwasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/895,217

(22) Filed: Jun. 8, 2020

(65) Prior Publication Data

US 2020/0302233 A1  Sep. 24, 2020

Related U.S. Application Data

(63) Continuation of application No. PCT/JP2017/044346, filed on Dec. 11, 2017.

(51) Int. Cl.
*G06K 9/62* (2022.01)
*G06N 20/00* (2019.01)
*G06K 9/00* (2022.01)

(52) U.S. Cl.
CPC ....... *G06K 9/6256* (2013.01); *G06K 9/00805* (2013.01); *G06N 20/00* (2019.01)

(58) Field of Classification Search
CPC combination set(s) only.
See application file for complete search history.

(56) References Cited

U.S. PATENT DOCUMENTS

| 2017/0011270 | A1 | 1/2017 | Kamada | |
| 2019/0196481 | A1* | 6/2019 | Tay | G01S 17/86 |
| 2019/0205706 | A1* | 7/2019 | Govindaraj | G06N 5/046 |
| 2020/0026283 | A1* | 1/2020 | Barnes | G05D 1/0088 |

FOREIGN PATENT DOCUMENTS

| JP | 2011-150627 A | 8/2011 |
| JP | 2017-138660 A | 8/2017 |
| WO | 2015/129045 A1 | 9/2015 |

OTHER PUBLICATIONS

International Search Report dated Jan. 16, 2018, issued in counterpart International Application No. PCT/JP2017/044346. (1 page).

* cited by examiner

*Primary Examiner* — Quan M Hua
(74) *Attorney, Agent, or Firm* — Westerman, Hattori, Daniels & Adrian, LLP (57) ABSTRACT

A data generation apparatus for automated travel, the data generation apparatus being a data collection apparatus characterized by comprising: obtaining means for obtaining external environment information; and labeling means for adding, to focus information included in the external environment information obtained by the obtaining means, a label corresponding to passing of a vehicle through a position at which the external environment information has been collected.

8 Claims, 6 Drawing Sheets

TRAINING DATA GENERATION APPARATUS

CROSS-REFERENCE TO RELATED APPLICATION(S)

This application is a continuation of International Patent Application No. PCT/JP2017/044346 filed on Dec. 11, 2017, the entire disclosures of which is incorporated herein by reference.

TECHNICAL FIELD

The present invention relates to a training data generation apparatus that collects training data for machine learning intended for, for example, automated driving.

BACKGROUND ART

Regarding a technique of automated driving of a vehicle, there is a suggestion for vehicle control by artificial intelligence that has learnt, through machine learning, driving operations in various situations during travel. In vehicle control by artificial intelligence, data detected by an onboard sensor, such as a camera and a radar, is input, and an output corresponding to, for example, a feature amount extracted from the input data is used in performing travel control, such as braking control for a brake and the like, steering control that performs steering, driving control for power of an engine and the like, and peripheral control for peripheral devices, such as lights. One of techniques for machine learning is supervised learning. In supervised learning, training data is prepared by adding annotations (also referred to as, for example, labels or tags) to data that is input in advance, and artificial intelligence performs learning using this training data as an input. For example, when image data is used as the input data, annotations are added as information indicating obstacles, white lines, signs, traffic lights, and the like that should be recognized in this image data. For example, PTL 1 describes one example of a system that uses such machine learning. According to this, an input image is divided into a plurality of blocks, and these blocks are categorized into classes in accordance with the possibility that each block includes a passage region by an apparatus that has performed learning based on learning data in which classes have been designated in advance by a user's instruction.

CITATION LIST

Patent Literature

PTL1: Japanese Patent Laid-Open No. 2011-150627

SUMMARY OF INVENTION

Technical Problem

However, the amount of information that is collected as training data for automated driving is immense, and the task of adding annotations for machine learning to the collected information is also an enormous task requiring a considerable amount of effort, cost, and time.

The present invention has been made in view of the foregoing conventional examples, and it is an object thereof to reduce the effort, cost, time, and the like required for machine learning.

Solution to Problem

To achieve the foregoing object, the present invention has the following configuration.

That is to say, one aspect of the present embodiment is a data generation apparatus for automated travel, the data generation apparatus comprising: obtaining means for obtaining external environment information; and labeling means for adding, to focus information included in the external environment information obtained by the obtaining means, a label corresponding to passing of a vehicle through a position at which the external environment information has been collected.

Advantageous Effects of Invention

According to the present invention, at least a part of labeling with respect to external environment information can be automated, thereby realizing a reduction in the effort, time, and cost for the task of generating training data.

Other features and advantages of the present invention will become apparent from the following description with reference to the attached drawings. Note that the same reference numerals denote the same or like constituents in the attached drawings.

BRIEF DESCRIPTION OF DRAWINGS

The attached drawings are included in and constitute a part of the specification, illustrate embodiments of the present invention, and are used, together with the description thereof, to explain the principle of the present invention.

DESCRIPTION OF EMBODIMENTS

First Embodiment

Configuration of Vehicle Control Apparatus

Figure 1:
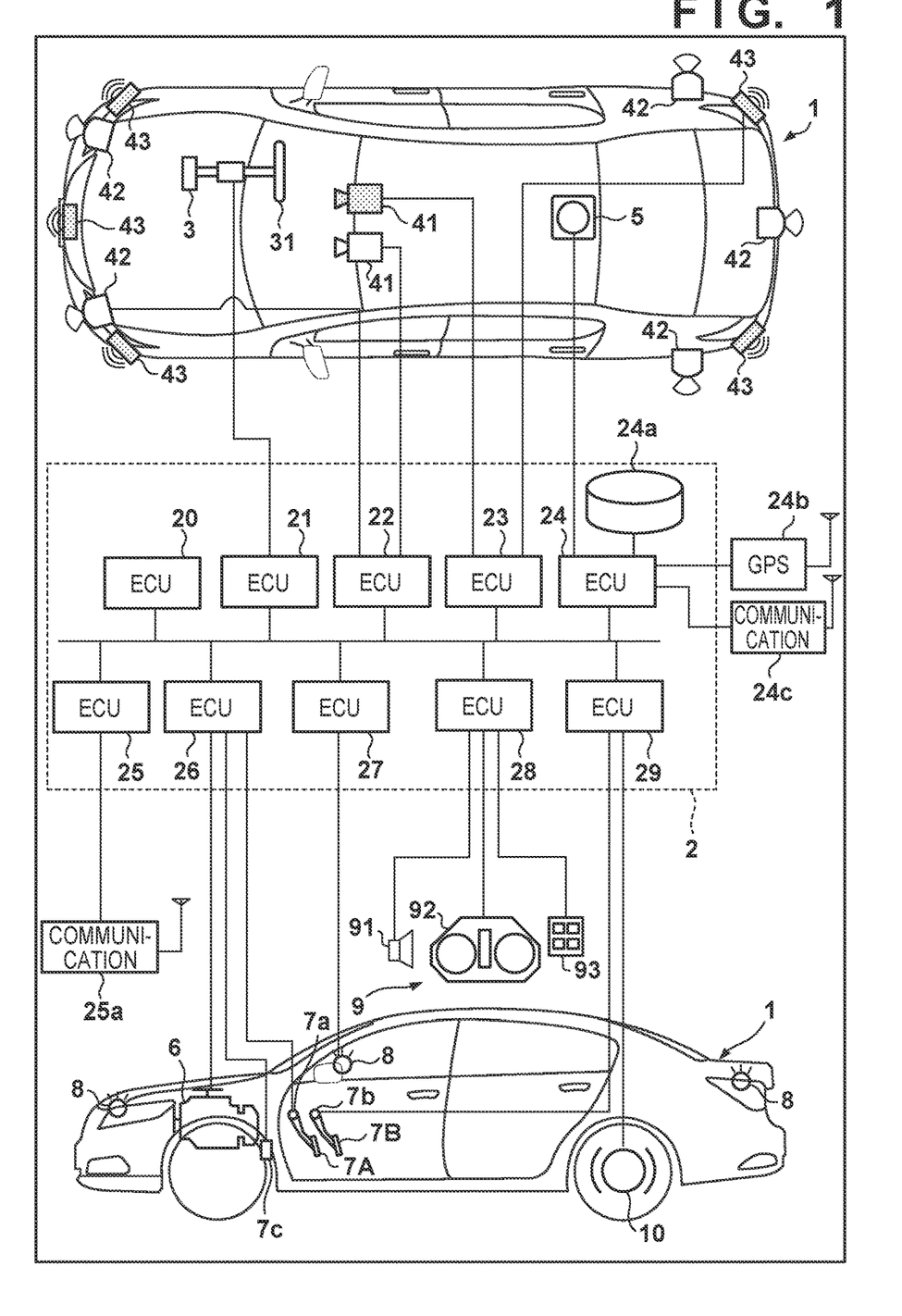
FIG. 1 is an explanatory diagram showing a configuration of a vehicle system.

FIG. 1 is a block diagram of a vehicle control apparatus according to one embodiment of the present invention. In FIG. 1, the schematics of a vehicle 1 are shown in a plan view and a side view. As one example, the vehicle 1 is a sedan-type, four-wheeled passenger car. In the present embodiment, the vehicle 1 is a data collection vehicle for generating an automated driving model, and at the same time, is a vehicle capable of performing automated driving using the generated automated driving model. Note that the automated driving model in the present embodiment is a compilation of data in which various types of information that are used as an input are associated with vehicle control parameters that are used as an output, and is generated through learning performed by artificial intelligence, which serves as a base, in the present example. While in operation as the data collection vehicle, the vehicle 1 is basically driven by a driver in a manual driving mode, and each sensor is used to collect data that serves as the basis for training data. On the other hand, while in operation as the vehicle under automated driving, the vehicle 1 travels in an automated driving mode, each sensor collects data indicating the state of the outside or the self-vehicle, and this data is used as an input for controlling automated driving. Note that a mode for data collection is referred to as a data collection mode. In the data collection mode, various types of sensors are used to obtain external environment information indicating the state of the environment external to the vehicle 1 and self-vehicle state information indicating the state of the self-vehicle, and these pieces of information are transmitted to a server (referred to as a training data generation server). The training data generation server applies labeling processing for mechanical categorization, as well as annotation processing for further adding annotations through manual processing, to collected data, and uses the resultant data as training data for machine learning. Note that although the labeling processing may be included in the annotation processing, a part of the annotation processing is automated in the present embodiment, and this automated process is referred to as the labeling processing for distinction.

The control device of FIG. 1 includes a control unit 2. The control unit 2 includes a plurality of ECUs 20 to 29 that are connected, via an in-vehicle network, in such a manner that they can perform communication. Each ECU includes a processor which is typically a CPU, a storage device such as a semiconductor memory, an interface with an external device, and so on. The storage device stores programs executed by the processor, data used by the processor for processing, and so on. Each ECU may include a plurality of processors, storage devices, interfaces, and so on.

The following describes functions and the like handled by each of the ECUs 20 to 29. Note that the number of ECUs and functions to be handled can be designed as appropriate, and further segmentalization or integration compared to the present embodiment is possible.

The ECU 20 executes control related to automated driving of the vehicle 1. In automated driving, automated control of at least one of steering and acceleration/deceleration of the vehicle 1 is performed. Also, automated driving may be performed based on an automated driving model generated by a configuration shown in FIG. 3. Furthermore, the ECU 20 also executes control related to collection of training data for machine learning, which is used in generating the automated driving model. Which one of automated driving and data collection is executed depends on, for example, a mode set by the driver (the automated driving mode or the data collection mode) in the present example.

The ECU 21 controls an electric power steering apparatus 3. The electric power steering apparatus 3 includes a mechanism that steers the front wheels in accordance with a driving operation (steering operation) of the driver with respect to a steering wheel 31. The electric power steering apparatus 3 also includes a motor that assists the steering operation or exerts a driving force for automated steering of the front wheels, a sensor that detects a steering angle, and so on. When a driving state of the vehicle 1 is automated driving, the ECU 21 controls a moving direction of the vehicle 1 by performing automated control of the electric power steering apparatus 3 in correspondence with an instruction from the ECU 20. In the data collection mode, the steering angle detected by the sensor may be transmitted to the training data generation server as a part of the self-vehicle state information, which is the target of collection.

The ECUs 22 and 23 control detection units 41 to 43 that detect the states of the surroundings of the vehicle, and perform information processing with respect to the detection results. The detection units 41 are cameras that shoot the front of the vehicle 1 (hereinafter may be referred to as cameras 41); in the case of the present embodiment, two of them are mounted on a front portion of a roof of the vehicle 1. By analyzing images shot by the cameras 41, extraction of an outline of an object and extraction of partition lines (e.g., white lines) of lanes on a road can be performed. In the data collection mode, a frame-based video shot by the cameras 41 may be transmitted to the training data generation server as a part of the external environment information, which is the target of collection. In this case, it is desirable that all frames be the target of transmission, but thinning may be performed to reduce the amount of data. In thinning out frames, it is desirable to set a thinning rate with which a frame interval after the thinning does not exceed a time interval of the labeling processing, which will be described using FIG. 5 and the like.

The detection units 42 are lidars (light detection and ranging; also referred to as laser radars) (hereinafter may be referred to as lidars 42), and detect an object around the vehicle 1 and measure a distance to the object. In the case of the present embodiment, five lidars 42 are provided: one on each corner portion of a front portion, one on the center of a rear portion, and one on each side of the rear portion of the vehicle 1. The detection units 43 are millimeter wave radars (hereinafter may be referred to as radars 43), and detect an object around the vehicle 1 and measure a distance to the object. In the case of the present embodiment, five radars 43 are provided: one on the center of the front portion, one on each corner portion of the front portion, and one on each corner portion of the rear portion of the vehicle 1. In the data collection mode, data detected by the lidars 42 and the radars 43 may also be transmitted to the training data generation server as a part of the external environment information.

The ECU 22 controls one of the cameras 41 and each lidar 42, and performs information processing with respect to the detection results. The ECU 23 controls the other camera 41 and each radar 43, and performs information processing with respect to the detection results. Mounting two sets of apparatuses that detect the states of the surroundings of the vehicle can improve the reliability of the detection results, and furthermore, mounting different types of detection units, such as cameras, lidars, and radars, enables multidimensional analysis on the environments of the surroundings of the vehicle. These detection units 41, 42, 43 (cameras 41, lidars 42, radars 43) may be referred to as sensors external to the vehicle (external sensors). Note that the external sensors may additionally include sensors for specifying other external environments, such as an outdoor air temperature sensor. The results of detection of such sensors may also be processed by the ECU 22 and the ECU 23. The results of detection of the external sensors can be used by other ECUs, for example, the ECU 20 and the like, to specify a travel environment.

The ECU 24 controls a gyroscope 5, a GPS sensor 24*b*, and a communication apparatus 24*c*, and performs information processing with respect to the detection results or the communication results. The gyroscope 5 detects a rotary motion of the vehicle 1, such as an angular velocity about a front-and-rear axis, and/or angular velocities about an up-and-down axis and a left-and-right axis of the vehicle 1. The ECU 24 can also obtain a yaw rate (yaw angular velocity) of the vehicle 1 from the result of detection of the gyroscope 5.

The course of the vehicle 1 can be determined from the result of detection of the gyroscope 5, the wheel speed, and the like. The GPS sensor 24b detects a current position of the vehicle 1. The communication apparatus 24c performs wireless communication with a server that provides map information and traffic information to obtain these pieces of information. It can further obtain external information, such as weather information and road surface information related to the road surface state, via the communication apparatus 24c. Regarding the weather information and the road surface information, not only information related to the vicinity of the current position of the vehicle, but also information related to areas along a travel path can be obtained when the travel path has been set. Furthermore, the communication apparatus 24c can perform wireless communication with a server shown in FIG. 2 (also referred to as a training data collection server), and transmit all or a part of the external environment information obtained by various types of onboard sensors, such as the cameras, to the training data collection server. The ECU 24 can access a database 24a of map information that is constructed in the storage device; for example, the ECU 24 searches for a route from a current location to a destination. In addition, the ECU 24 may process output signals from acceleration sensors that detect acceleration in the left-and-right and front-and-rear directions (and/or the up-and-down direction) of the vehicle 1, and from sensors for angular acceleration about these axes. These sensors may be provided in the same sensor unit as the gyroscope 5. These sensors, a wheel speed sensor 7c to be described later, and the like are sensors inside the vehicle that detect the state of the vehicle 1 itself, and are collectively referred to as internal sensors. Also, a yaw rate and acceleration obtained from these sensors can be passed to other ECUs, such as the ECU 20, via a bus and used to specify a travel environment. Furthermore, in the data collection mode, information obtained by the internal sensors may also be transmitted to the training data collection server as the self-vehicle state information.

The ECU 25 includes a communication apparatus 25a for inter-vehicle communication. The communication apparatus 25a performs wireless communication with another vehicle therearound to perform inter-vehicle exchange of information. It is also possible to use the communication apparatus 25a to obtain the aforementioned external information.

The ECU 26 controls a power plant 6. The power plant 6 is a mechanism that outputs a driving force for rotating driven wheels of the vehicle 1, and includes, for example, an engine and a transmission. For example, the ECU 26 controls an engine output in correspondence with a driving operation (accelerator operation or accelerating operation) of the driver detected by an operation detection sensor 7a provided in an accelerator pedal 7a, and switches a gear ratio of the transmission based on information of a vehicle speed and the like detected by the wheel speed sensor 7c. When a driving state of the vehicle 1 is automated driving, the ECU 26 controls acceleration/deceleration of the vehicle 1 by performing automated control of the power plant 6 in correspondence with an instruction from the ECU 20. As stated earlier, the wheel speed obtained from a signal from the wheel speed sensor 7c (or information obtained from another detection signal) and the state of a driving operation of the driver detected by the operation detection sensor 7a may be used by other ECUs, such as the ECU 20, in processing for specifying a travel environment, or may be transmitted to the training data collection server as a part of the self-vehicle state information.

The ECU 27 controls lighting devices (headlights, tail lights, and the like), including direction indicators 8 (blinkers). In the case of the example of FIG. 1, the direction indicators 8 are mounted on the front portion, side mirrors, and rear portion of the vehicle 1.

The ECU 28 controls an input/output apparatus 9. The input/output apparatus 9 outputs information to the driver, and accepts an input of information from the driver. A speech output apparatus 91 notifies the driver of information using speech. A display apparatus 92 notifies the driver of information by displaying an image. The display apparatus 92 is disposed on, for example, a surface anterior to a driver's seat, and constitutes an instrument panel and the like. Note that although speech and display have been exemplarily described here, vibration and light may be used in notification of information. Also, two or more of speech, display, vibration, and light may be used in combination in notification of information. Furthermore, the combination may be changed, or the mode of notification may be changed, in accordance with the level (e.g., emergency level) of information to be notified.

An input apparatus 93 is, for example, a group of switches or a touchscreen that is disposed at a position where it can be operated by the driver and issues an instruction to the vehicle 1; it may also include a speech input apparatus.

The ECU 29 controls brake apparatuses 10 and a parking brake (not shown). The brake apparatuses 10 are, for example, disk brake apparatuses, are provided on the respective wheels of the vehicle 1, and decelerate or stop the vehicle 1 by applying resistance to the rotation of the wheels. For example, the ECU 29 controls the actions of the brake apparatuses 10 in correspondence with a driving operation (braking operation) of the driver detected by an operation detection sensor 7b provided in a brake pedal 7B. When a driving state of the vehicle 1 is automated driving, the ECU 29 controls deceleration and stopping of the vehicle 1 by performing automated control of the brake apparatuses 10 in correspondence with an instruction from the ECU 20. The brake apparatuses 10 and the parking brake can also be put into action in order to maintain a stopped state of the vehicle 1. Also, when the transmission of the power plant 6 includes a parking lock mechanism, it is also possible to put the parking lock mechanism into action in order to maintain the stopped state of the vehicle 1. Furthermore, in the data collection mode, the state of a driving operation of the driver detected by the operation detection sensor 7b may be transmitted to the training data collection server as a part of the self-vehicle state information. Moreover, information indicating braking and the aforementioned steering angle may be information indicating a change in a state by a predetermined extent or more, and time information indicating the time at which the change in the state occurred may be added to the information indicating the change in the state. Associating the information indicating the state of braking and steering with time makes it possible to specify the time at which the change in the state occurred, and synchronizing this time throughout the entire vehicle 1 makes it possible to establish synchronization with data detected by other sensors. It goes without saying that this is merely one example of a method of establishing synchronization among collected pieces of data.

Training Data Collection Server

Figure 2:
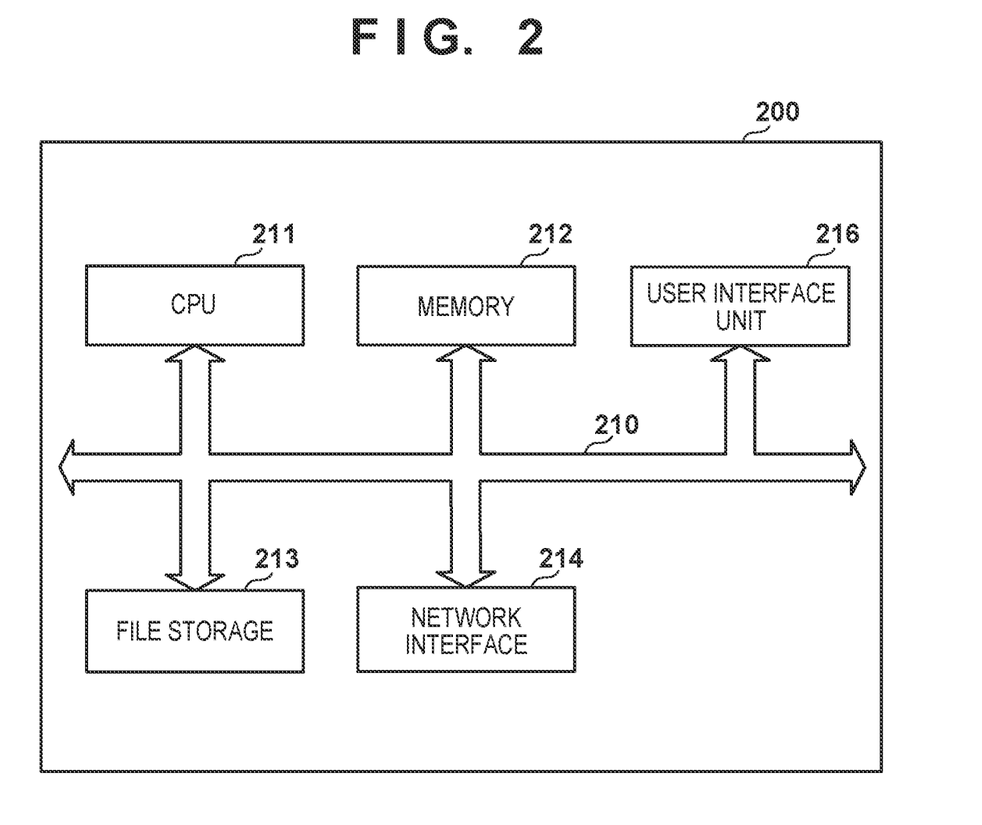
FIG. 2 is a block diagram showing a configuration of a server.

FIG. 2 shows a hardware configuration of a training data collection server 200. The training data collection server 200 basically has a configuration of a general-purpose computer. By executing programs loaded to a memory 212, a CPU 211 realizes, for example, a functional configuration shown in FIG. 3, and also executes a procedure shown in FIG. 5. The programs, data to be processed, and the like are stored in the memory 212. A user interface unit 216 displays image data and the like to an operator, and also accepts an input from the operator. For example, it can display frames extracted from video data, and accept annotations that have been input. A data file and a program file that have been received from the vehicle 1, or input via a storage medium, are stored in a file storage 213. The data file includes external environment information, self-vehicle state information, and the like collected by the vehicle 1. A network interface 214 receives the external environment information and the self-vehicle state information collected by the vehicle 1 by performing wireless communication with, for example, the communication apparatus 24c of the vehicle 1. Note that the training data collection server 200 can also be referred to as a data generation apparatus as it generates training data from collected data, and further generates therefrom an automated driving model that is realized by artificial intelligence.

Figure 3:
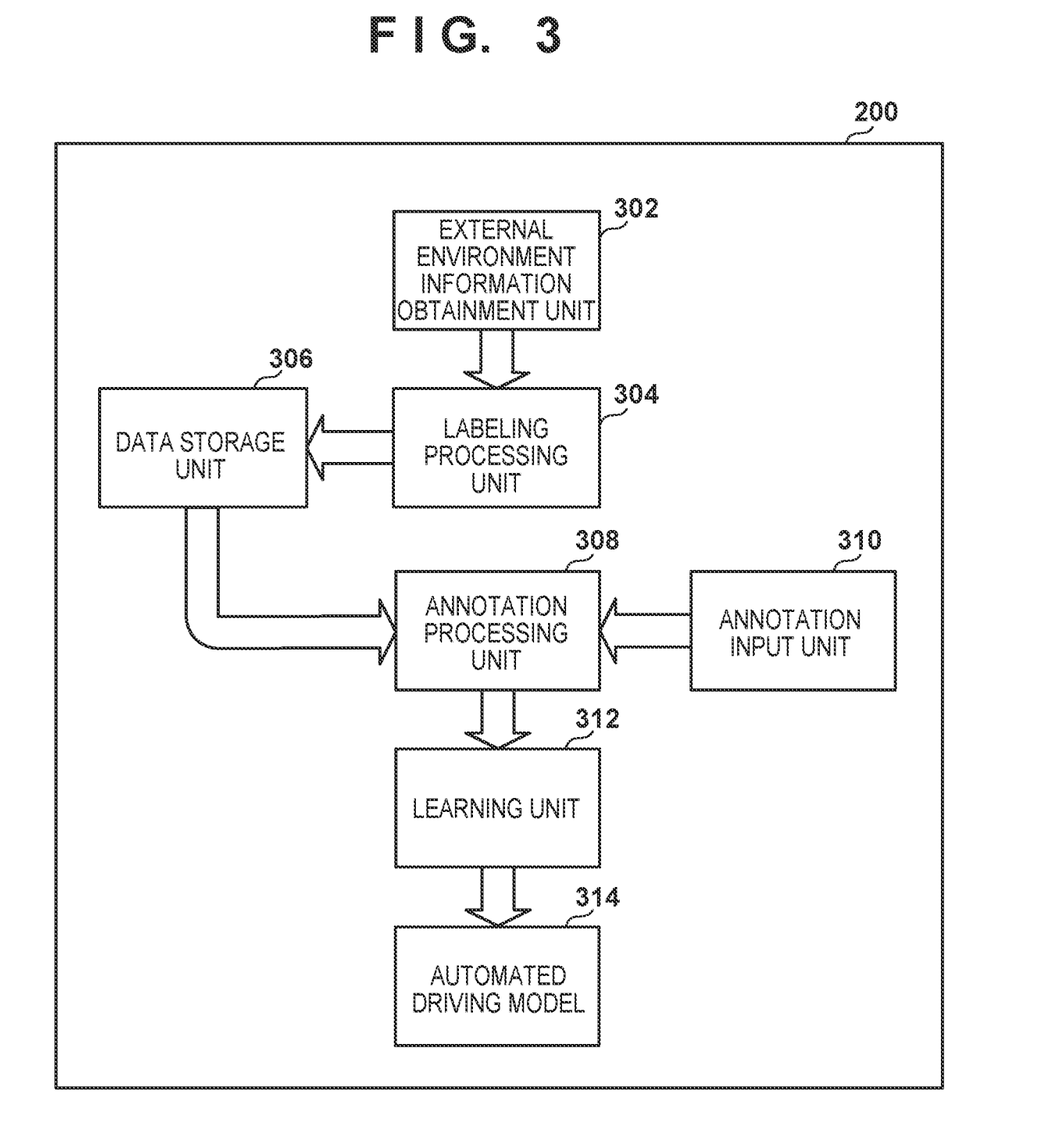
FIG. 3 is a block diagram showing a configuration for generating an automated driving model based on external environment information.

FIG. 3 shows one example of a functional block diagram for generating an automated driving model based on collected training data in the training data collection server 200. An external environment information obtainment unit 302 extracts external environment information stored in the file storage 213, and inputs the same to a labeling processing unit 304. Here, the external environment information obtainment unit 302 is not limited to obtaining the entirety of the external environment information stored in the file storage 213, and may extract a part thereof. The external environment information includes video data shot by the cameras, obstacle data obtained by the lidars and radars, and so on. It can be said that these pieces of data are, for example, temporally discrete pieces of data, and are pieces of data indicating the states of the outside of the vehicle at the timings at which they were obtainment. For example, video data is composed of frames that were captured at a predetermined time interval, and each frame is an image within the shooting ranges of the cameras 41 at a time point at which it was shot. The same goes for data obtained by other sensors. This data at a certain time point, for example, a frame of a video, is the target of the labeling processing in the present embodiment. All frames that have been captured may be the target of labeling; however, for example, when all frames need not be the target of labeling, such as when a frame rate is high to the extent that it exceeds the control precision of automated driving, frames may be obtained by thinning out a group of consecutive frames.

The labeling processing unit 304 regards the input external environment information as focus information, and adds a label to the focus information in accordance with predetermined criteria. For example, when a video is used as the external environment information, the external environment information obtainment unit 302 inputs the external environment information to the labeling processing unit 304 on a per-frame basis. The labeling processing unit 304 regards the input frame as focus information, and adds a label thereto. The addition of a label may be referred to as tagging. Also, a label may be considered as a part of an annotation. The details of the labeling processing will be described later with reference to FIG. 5. The labeling processing unit 304 stores the focus information to which the label has been added to a data storage unit 306. The label added by the labeling processing unit 304 is a label indicating, for example, a place through which the vehicle was able to pass. The way of adding the label will be described later in more detail with reference to FIG. 5.

An annotation processing unit 308 extracts the external environment information, for example, the frame of the video, to which the labeling processing was already applied from the data storage unit 306, and adds an annotation input from an annotation input unit 310. Note that a label that has already been added by the labeling processing unit 304 may not be added as an annotation. That is to say, in the present embodiment, the annotation processing unit 308 may not add information indicating a passable region as an annotation again. An annotation is information input by an operator, and denotes information that should be output from a driving model that is intended to be generated in accordance with the input external environment information. For example, in recognizing an obstacle, white lines, and the like in the video, an annotation may be, for example, information indicating the position and region of the obstacle, white lines, and the like within a frame image that should become a recognition result. In this case, although parameters for travel control are not directly output, an automated driving model may be generated by, for example, performing learning for outputting the parameters for travel control using the recognized obstacle, white lines, and the like as an input. It goes without saying that this is one example; an appropriate annotation is added in accordance with the type of the input external environment information, and further in accordance with information that should be output based on the input external environment information. Also, a label and an annotation may be associated with feature information extracted from focus information, rather than the focus information itself.

A learning unit 312 inputs the external environment information to which the annotation was added by the annotation processing unit 308 as training data to artificial intelligence, which serves as a base, and causes the artificial intelligence to perform learning. The learning unit 312 generates an automated driving model 314 through learning, and outputs the same. The automated driving model 314 of the present embodiment is a compilation of data that uses the external environment information with the annotation as an input, and outputs travel control parameters corresponding to the input; however, the output may be a recognition result of image recognition or may be another output. For example, a position in an image through which the vehicle can pass may be obtained as the output. It is desirable that this specified position be, for example, a position on a map that is specified from a distance and a direction from the vehicle. This compilation of data that forms the automated driving model may be regarded as, for example, a conversion table with which the input external environment information is weighted as parameters and the weighted parameters are computed and mapped in a final output. The weights encompassed within the automated driving model 314 can also be considered as, for example, values indicating the magnitudes of connections among the parameters or the magnitudes of influences of the parameters, and it can be said that learning is a process of correcting or determining weighting based thereon from the correspondence between the input given as training data and the output. Note that an existing method may be used as a learning method. Note that although the input is limited to the external environment information with the annotation in FIG. 3, no limitation is intended by this, and the automated driving model may be generated by further inputting, for example, the self-vehicle state information.

Figure 4:
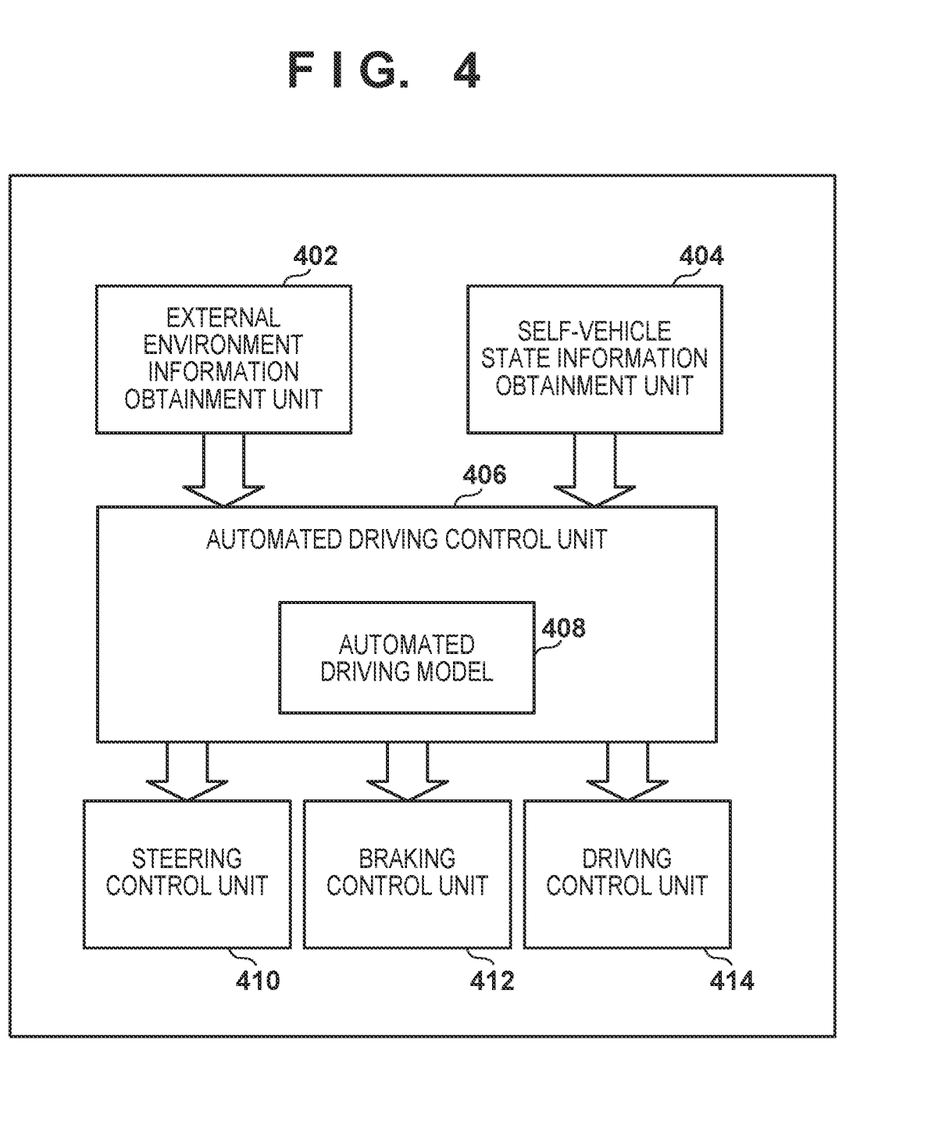
FIG. 4 is a block diagram for automated driving control of a vehicle using an automated driving model.

The automated driving model that has been generated and output is installed in the vehicle 1 that realizes travel control of automated driving, and is provided for use in automated driving. FIG. 4 shows a configuration that is intended for the vehicle 1 to travel under automated driving, and is realized by, for example, the ECU 20 executing programs. FIG. 4 will be described using an example in which travel control is performed using not only the external environment information, but also the self-vehicle state information, as an input. An external environment information obtainment unit 402 obtains outputs from the sensors included in the vehicle 1, such as the cameras 41, the lidars 42, and the radars 43, and inputs them to an automated driving control unit 406. A self-vehicle state information obtainment unit 404 obtains a steering angle, a braking force (a brake depression force), an accelerator pedal position, and the like detected by the sensors included in the vehicle 1, and inputs them to the automated driving control unit 406. Using an automated driving model 408 generated by the training data collection server 200, the automated driving control unit 406 realizes travel control by outputting control parameters corresponding to the input. In the present example, the targets of control are steering, braking, and driving (the engine or motor), and the outputs for the respective targets of control are passed to a steering control unit 410, a braking control unit 412, and a driving control unit 414. The control units perform their respective controls in accordance with the input control parameters. It goes without saying that the targets of control may be targets other than the foregoing, and may include, for example, lights and the like. Here, the steering control unit 410, the braking control unit 412, and the driving control unit 414 are controlled in accordance with control information input from the automated driving control unit 406. For example, assume that the automated driving control unit 406 obtains, as an output from the automated driving model 408, a passable position in a video frame that is currently obtained in real time. In this case, the automated driving control unit 406 controls steering, braking, and driving so as to travel through the obtained passable position.

Figure 5:
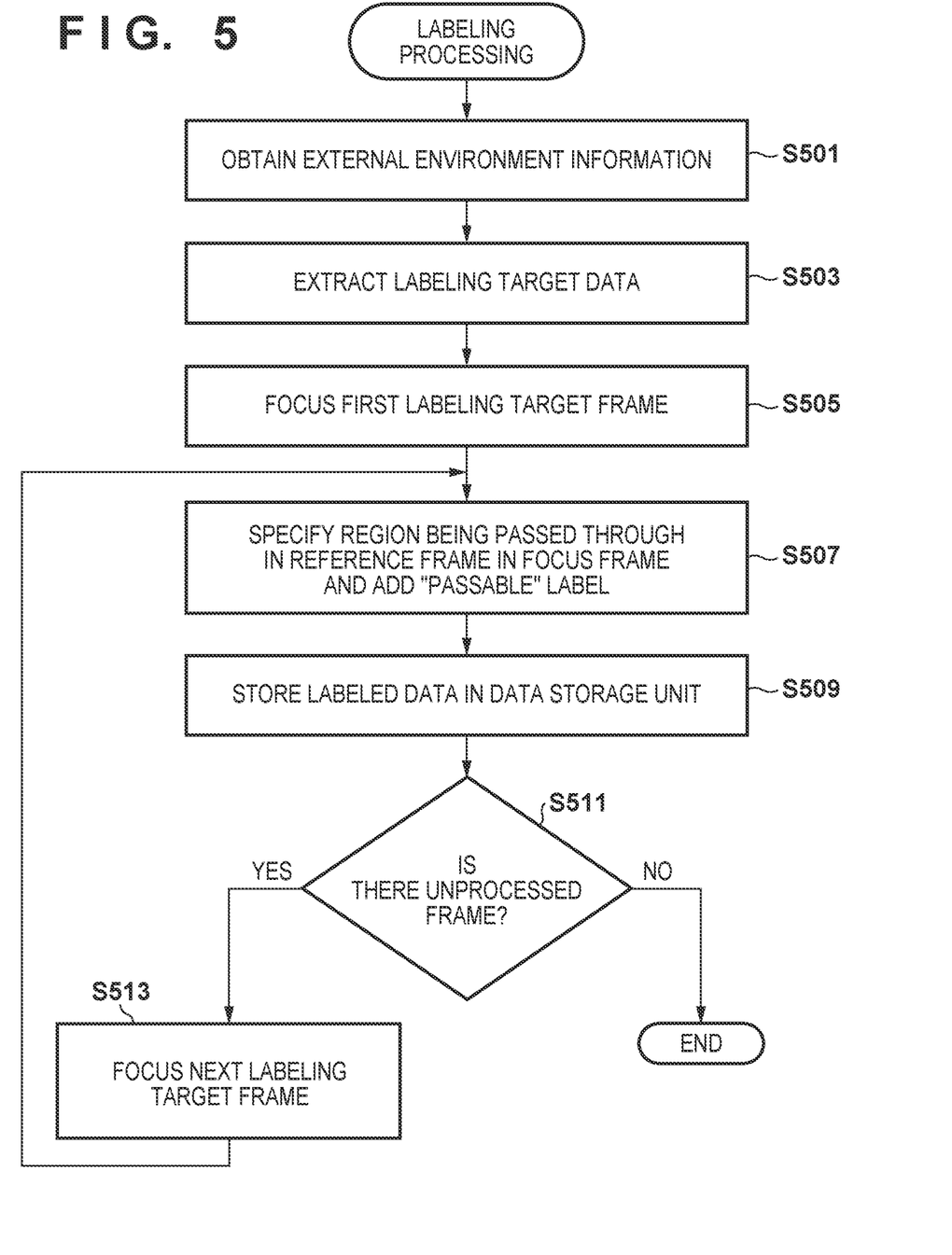
FIG. 5 is a flowchart showing a procedure of labeling with respect to obtained external environment information.

FIG. 5 shows a procedure of the labeling processing of the external environment information obtainment unit 302 and the labeling processing unit 304. In terms of hardware, the main executor is the CPU 211. In the present example, the labeling processing is, for example, processing for focusing on a frame that constitutes a video (or moving images) and associating this frame with a label. Intuitively speaking, it can be said that the labeling processing of the present embodiment is processing for marking a path through which the vehicle has passed in a frame of a video shot by the cameras 41. In view of this, first, external environment information is obtained (S501), and reference data to be used for labeling is extracted therefrom (step S503). This can prevent a processing load from becoming excessive due to an excessively short moving distance of the vehicle between frames depending on a frame rate of video data and a vehicle speed. This reference data also includes labeling target data that is to be the target of labeling (or simply referred to as target data, target information, or target frame). When the entirety of the obtained external environment information (i.e., all frames of the video) is used, it can be said that necessary data has already been extracted, and thus step S503 may not be performed.

Here, in the present embodiment, frame extraction is performed using the following method, for example. In the present embodiment, two cameras 41 are disposed in parallel along a vehicle width direction (see FIG. 1). Thus, in step S501, synchronous videos that have been shot by these two cameras 41 are obtained. In step S503, based on parallax of two synchronous frames having different viewpoints, a distance to a specific object within the frames is estimated, and a distance by which the vehicle moved between consecutive frames is estimated. Then, frames are extracted so that the moving distance between frames is substantially constant. The distance estimation may not be performed with respect to every frame, and may be performed at an interval of a certain number of frames. This is because it is expected that acceleration of the vehicle traveling on a general public road is normally not so excessive. The frames extracted in step S503 are frames to be referred to for labeling, and at least a part thereof serves as a labeling target frame. When labeling is performed using every frame, the extraction in step S503 may not be performed.

Next, in step S505, adequate frames, for example, the oldest travel scenes, are specified from among the frames extracted in step S503, and focus is placed on the first frame of the specified frames. The frame on which focus is placed is a labeling target frame, which is referred to as a focus frame. Note that the traveling scenes may be specified as scenes in which the aforementioned moving distance between frames exceeds a predetermined value. It is sufficient to select 0 or a value larger than 0 as the predetermined value used as a threshold. Also, a labeling target frame next to the focus frame is also specified here. This frame is referred to as a reference labeling target frame. Although there is a case where frames exist between the focus frame and the reference labeling target frame, these frames and the reference labeling target frame are collectively referred to as reference frames. Here, for example, it is assumed that labeling is to be performed with respect to frames with an interval of approximately a distance L in terms of an approximate moving distance of the vehicle. When the moving distance of the vehicle between frames that was estimated from the videos in the manner described with reference to step S503 is D (in a case where frames have been thinned, a value obtained by division by a thinning rate), the distance L is converted into the number of frames, that is to say, L/D (frames). In step S505, for example, it is sufficient to specify a frame with an interval of L/D frames from the first labeling target frame as the reference labeling target frame. Note that the labeling target frame may be of a video that was shot by only one of the two cameras. The method of estimating the moving distance between frames may be another method; for example, speed information that is synchronous with the videos, or acceleration information that is similarly synchronous with the videos, may be referred to.

Once focus has been placed on the labeling target frame, in step S507, the position through which the self-vehicle has passed in this focus frame is specified, and a mark indicating that this position was passable (a "passable" label) is added. To this end, for example, the reference frame after the focus frame is referred to, and a region that is exactly being passed through in the reference frame is specified. Then, this region is associated in the focus frame, and a label indicating that this region is a passable region is added. When the cameras 42 are placed at the center of the vehicle width direction so that their lines of sight are parallel to the direction in which the vehicle is moving straightforward, the frame center represents the moving direction of the vehicle at the time of shooting of frames. Therefore, a region that is located at a central portion of a lower edge of the frames and that corresponds to a vehicle size is exactly a region that is currently passed through. As the cameras 41 are fixed with respect to the vehicle, the region through which the vehicle is exactly passing currently can be specified even if it is outside the frames. This region is mapped in the focus frame. For example, this mapping can be performed by recognizing the images of the reference frame and the focus frame, and associating the respective images with each other. When there are a plurality of reference frames, a passable label is added to a plurality of regions within the focus frame. It goes without saying that a region that is outside the focus frame as a result of mapping is not the target of labeling. The region may be specified using, for example, coordinates, vectors, and the like within the frames.

The labeled frame to which the label was added in step S507 is stored to the data storage unit 306 in step S509. This serves as the target of the annotation processing. In step S511, whether there is an unprocessed frame to which the labeling processing should be applied is determined, and if there is no unprocessed frame, the processing ends. On the other hand, if there is an unprocessed frame, the next labeling target frame is specified, and focus is placed thereon. Here, it is sufficient to use the current reference labeling target frame as a new focus frame, and specify a new reference labeling target frame in the manner described with reference to step S505. Then, the processing branches off to step S507, and the labeling processing is iterated.

Figure 6:
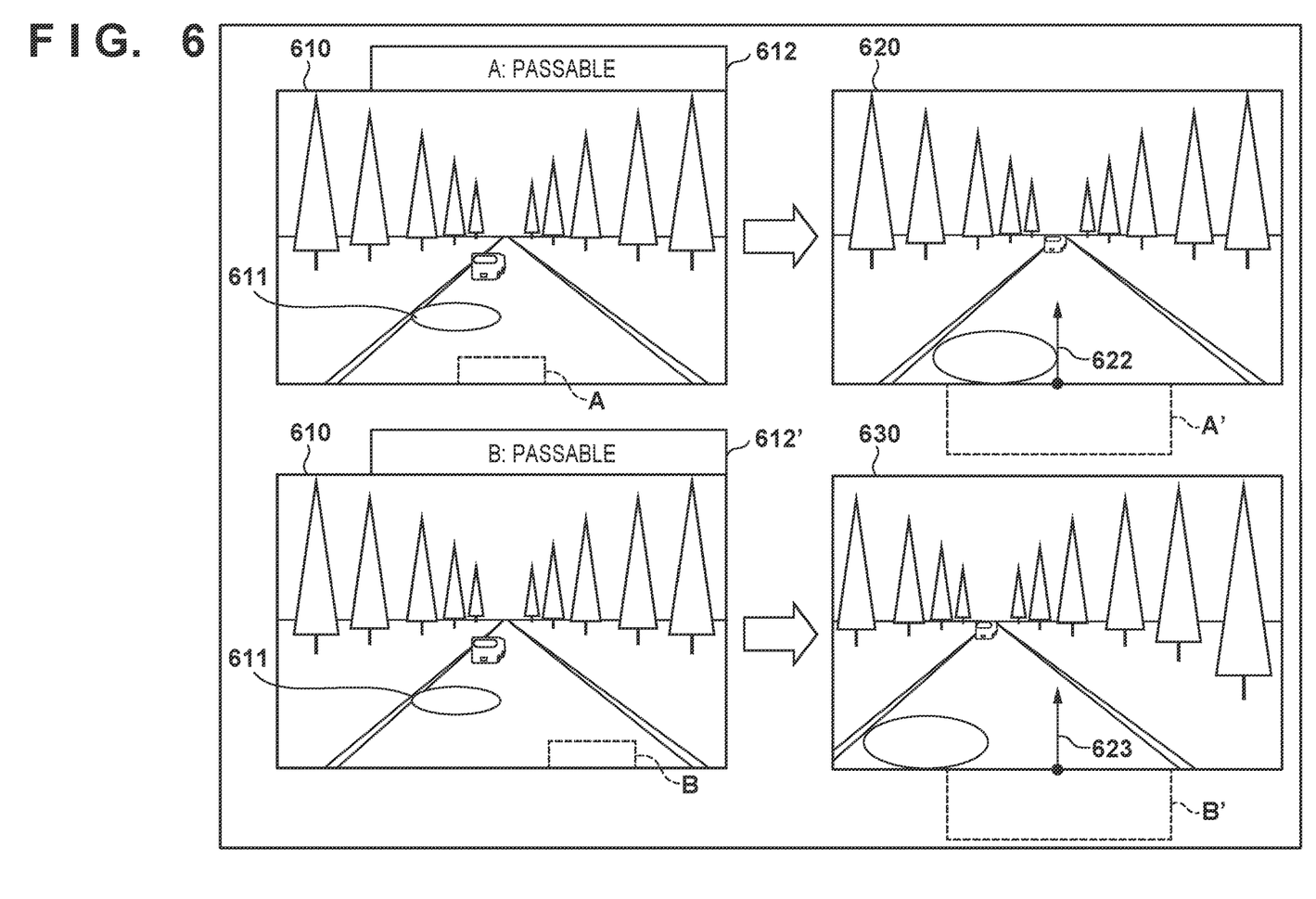
FIG. 6 is a diagram showing specific examples of labeling during travel.

FIG. 6 shows examples of a video frame and a label that is added to a specific region within the frame. It goes without saying that these examples are schematically shown for visualization. A frame 610 includes an object 611. The processing of FIG. 5 is executed using this frame as a labeling target frame, and a frame 620 and a frame 630 as reference frames. Note that the frame 620 and the frame 630 are presented to show different situations as examples, and are not intended to exist at the same time. In the reference frame 620, an arrow 622 represents a velocity vector. Also, a region that is exactly being passed through is represented as a region A'. Mapping this in the frame 610 yields a region A as a passable region, and once the region A has been specified, a label indicating a passable state is added. Note that, for example, if the region A' includes the object 611 and the object 611 has already been specified in an image, the passable label may be added with respect to this object 611. In this case, a label for the region A' may be added together, or a label may be added only to the object. Similarly, in the reference frame 630 also, a passage region B' is specified below an arrow 623. Then, this is mapped in the frame 610, and a passable label is added with respect to a mapped region B.

In the above-described manner, according to the present embodiment, a label can be added, mechanically or automatically, with respect to external environment information. As there is no need to add an annotation with respect to the added label, the effort, time, and cost for the annotation processing can be reduced. Also, in the present embodiment, as the addition of a label is based on the record indicating that the vehicle was actually able to pass, labeling with high reliability can be realized.

Note that although the present embodiment has been described under the assumption that the labeling processing unit 304 is included in the training data generation server 200, the labeling processing unit 304 may be provided in the vehicle 1, and data collected by the cameras 41 and the like may be transmitted to the training data generation server after the labeling processing is applied to the data in the vehicle. In this case, as the position through which the vehicle passed can be specified in real time from, for example, videos (frames) obtained by the cameras 41 and self-vehicle state information including a travel speed and the like, it is sufficient to add a "passable" label with respect to this position. Furthermore, the medium through which data collected by the vehicle 1 is passed to the training data generation server 200 is not limited to wireless communication; the collected data may be stored to a storage medium, and then moved to the training data generation server 200 together with the medium or transmitted via wired communication. Also, as exemplarily shown in FIG. 6, a "passable" label may also be added by the labeling processing unit 304. In performing this addition, labeling is performed in step S507 of FIG. 5. Furthermore, the target of labeling is not limited to image data, and may be another data as long as it is data used as training data. Moreover, a label to be added is not limited to indicating a passable state or a non-passable state, and may be a label having another meaning as long as it is a label that can be added mechanically.

Summary of Embodiment

The above-described present embodiment is summarized as follows.

(1) A first aspect of the present embodiment is a data generation apparatus for automated travel, the data generation apparatus being a data collection apparatus characterized by comprising: obtaining means for obtaining external environment information; and labeling means for adding, to focus information included in the external environment information obtained by the obtaining means, a label corresponding to passing of a vehicle through a position at which the external environment information has been collected.

According to this configuration, at least a part of labeling with respect to the external environment information can be automated, thereby realizing a reduction in the effort, time, and cost for the task of generating training data.

(2) A second aspect of the present embodiment is the data generation apparatus characterized in that, in addition to the first aspect, the obtaining means obtains the external environment information that has been detected by detecting means installed in the vehicle.

According to this configuration, the external environment information can be obtained by the detecting means installed in the vehicle, and the training data can be generated more efficiently with higher reliability.

(3) A third aspect of the present embodiment is the data generation apparatus characterized in that, in addition to the second aspect, the labeling means specifies a position through which the vehicle has passed based on the external environment information that has been obtained at a position that is reached after travelling by a predetermined distance from a position at which the focus information has been obtained, and adds a passable label to a position corresponding to the position through which the vehicle has passed in the focus information.

According to this configuration, especially the addition of the label indicating that the vehicle is able to pass can be performed efficiently.

(4) A fourth aspect of the present embodiment is the data generation apparatus characterized in that, in addition to the third aspect, the external environment information includes image information that is based on frames shot by a camera, and the labeling means adds the label using the frames as the focus information.

According to this configuration, labeling can be performed using the frames of the image information as the external environment information, thereby making efficient the generation of the training data from image data.

(5) A fifth aspect of the present embodiment is the data generation apparatus characterized in that, in addition to the fourth aspect, the predetermined distance is a distance corresponding to a preset frame interval.

According to this configuration, labeling processing can be performed with a delay corresponding to a preset number of frames, the speed of processing can be increased, and a memory for buffering the frames can be saved.

(6) A sixth aspect of the present embodiment is the data generation apparatus characterized in that, in addition to the fourth and fifth aspects, the labeling means adds a label at an interval of a predetermined number of frames.

According to this configuration, labeling target frames can be thinned out, and a processing load can be reduced.

(7) A seventh aspect of the present embodiment is the data generation apparatus characterized in that, in addition to the third to sixth aspects, the labeling means determines that a region that has not been passed through in the focus frame is not passable, and adds a non-passable label to the focus information.

According to this configuration, a label can be added not only in a passable state, but also in a non-passable state.

(8) An eighth aspect of the present embodiment is the data generation apparatus characterized by, in addition to the first to seventh aspects, further comprising means for generating training data by further adding an annotation, in accordance with an operation of an operator, to the external environment information to which the label has been added by the labeling means.

According to this configuration, based on the external environment information that has already been labeled, the training data to which the annotation has been further added can be generated.

(9) A ninth aspect of the present embodiment is the data generation apparatus characterized by, in addition to the eighth aspect, further comprising leaning means for generating an automated driving model by performing machine learning using the training data.

According to this configuration, the automated driving model to be provided for automated driving of the vehicle can be generated based on the external environment information that has been labeled automatically.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A data generation apparatus for automated travel, the data generation apparatus being a data collection apparatus comprising:
    at least one processor; and
    at least one memory that stores at least one program, wherein the at least one program causes the at least one processor, when executed by the at least one processor, to perform operations comprising:
    obtaining external environment information that has been detected by a detecting unit installed in the vehicle; and
    adding, to focus information included in the external environment information obtained in the obtaining, a label corresponding to passing of a vehicle through a position at which the external environment information has been collected, wherein
    in the adding, a position through which the vehicle has passed is specified based on the external environment information that has been obtained at a position that is reached after travelling by a predetermined distance from a position at which the focus information has been obtained, and a passable label is added to a position corresponding to the position through which the vehicle has passed in the focus information.

2. The data generation apparatus according to claim 1, wherein
    the external environment information includes image information that is based on frames shot by a camera, and
    the labeling unit adds the label using the frames as the focus information.

3. The data generation apparatus according to claim 2, wherein
    the predetermined distance is a distance corresponding to a preset frame interval.

4. The data generation apparatus according to claim 2, wherein
    a label is added at an interval of a predetermined number of frames.

5. The data generation apparatus according to claim 1, wherein
    a region that has not been passed through in the focus information is detected not to be passable, and a non-passable label is added to the focus information.

6. The data generation apparatus according to claim 1, wherein the operations further comprise:
    generating training data by further adding an annotation, in accordance with an operation of an operator, to the external environment information to which the label has been added.

7. The data generation apparatus according to claim 6, wherein the operations further comprise:
    generating an automated driving model by performing machine learning using the training data.

8. The data generation apparatus according to claim 1, wherein the operations further comprises:
    referring to a reference frame that has been shot after a focus frame to specify a region where the vehicle is passing through in the reference frame, wherein the region is located at a central portion of a lower edge of the reference frames and corresponds to a vehicle size in the reference frame,
    mapping the region in the reference frame to the focus frame, and
    adding the passable label to the mapped region in the focus frame.

* * * * *